United States Patent
Mizuno et al.

(10) Patent No.: US 12,122,916 B2
(45) Date of Patent: Oct. 22, 2024

(54) SILICONE COMPOSITION AND CURABLE GREASE

(71) Applicant: SEKISUI POLYMATECH CO., LTD., Saitama (JP)

(72) Inventors: Takaaki Mizuno, Saitama (JP); Shigeru Koyano, Saitama (JP)

(73) Assignee: SEKISUI POLYMATECH CO., LTD., Saitama (JP)

(*) Notice: Subject to any disclaimer, the term of this patent is extended or adjusted under 35 U.S.C. 154(b) by 630 days.

(21) Appl. No.: 17/432,227

(22) PCT Filed: Mar. 25, 2020

(86) PCT No.: PCT/JP2020/013219
§ 371 (c)(1),
(2) Date: Aug. 19, 2021

(87) PCT Pub. No.: WO2020/196584
PCT Pub. Date: Oct. 1, 2020

(65) Prior Publication Data
US 2022/0169853 A1  Jun. 2, 2022

(30) Foreign Application Priority Data
Mar. 28, 2019 (JP) ................. 2019-062843

(51) Int. Cl.
| | |
|---|---|
| C08L 83/04 | (2006.01) |
| C09K 5/14 | (2006.01) |
| C10M 107/50 | (2006.01) |
| C10M 111/04 | (2006.01) |
| C10M 125/02 | (2006.01) |
| C10M 125/04 | (2006.01) |
| C10M 125/10 | (2006.01) |
| C10M 145/40 | (2006.01) |
| C10M 169/04 | (2006.01) |
| C10M 171/00 | (2006.01) |
| C10M 177/00 | (2006.01) |
| C10N 10/16 | (2006.01) |

(Continued)

(52) U.S. Cl.
CPC ............ *C08L 83/04* (2013.01); *C09K 5/14* (2013.01); *C10M 107/50* (2013.01); *C10M 111/04* (2013.01); *C10M 125/02* (2013.01); *C10M 125/04* (2013.01); *C10M 125/10* (2013.01); *C10M 145/40* (2013.01); *C10M 169/04* (2013.01); *C10M 171/00* (2013.01); *C10M 177/00* (2013.01); *H01F 1/113* (2013.01); *H01F 1/12* (2013.01); *H01F 1/33* (2013.01); *H01F 1/37* (2013.01); *H01F 1/44* (2013.01); *H01F 1/445* (2013.01); *H01F 1/447* (2013.01); *C08L 2207/324* (2013.01); *C10M 2201/041* (2013.01); *C10M 2201/05* (2013.01); *C10M 2201/06* (2013.01); *C10M 2201/062* (2013.01); *C10M 2201/105* (2013.01); *C10M 2209/12* (2013.01); *C10M 2229/025* (2013.01); *C10N 2010/16* (2013.01); *C10N 2040/14* (2013.01); *C10N 2050/10* (2013.01)

(58) Field of Classification Search
CPC ... H01F 1/28; H01F 1/37; H01F 1/113; H01F 1/33; H01F 1/44; H01F 1/445; H01F 1/447; C08L 84/04; C10M 107/50; C10M 111/04; C10M 125/04; C10M 125/10; C10M 125/02; C10M 145/40; C10M 169/04; C10M 177/00; C10M 2201/041; C10M 2201/05; C10M 2201/062; C10M 2201/06; C10M 2201/105; C10M 2209/12; C10M 2229/025; C10M 17/60; C10N 2020/16; C10N 2050/10; C10N 2040/14
See application file for complete search history.

(56) References Cited

U.S. PATENT DOCUMENTS

| | | |
|---|---|---|
| 2001/0051673 A1 | 12/2001 | Suzuki et al. |
| 2003/0008969 A1 | 1/2003 | Takahashi |

(Continued)

FOREIGN PATENT DOCUMENTS

| | | | |
|---|---|---|---|
| CN | 1805077 | * | 7/2006 |
| CN | 102875140 A | | 1/2013 |

(Continued)

OTHER PUBLICATIONS

International Search Report for PCT Patent App. No. PCT/JP2020/013219 (Jun. 16, 2020).

*Primary Examiner* — C Melissa Koslow
(74) *Attorney, Agent, or Firm* — Future IP LLC; Tomoko Nakajima

(57) ABSTRACT

A silicone composition having an electromagnetic wave absorbing property and thermal conductivity includes liquid silicone; a high-specific-gravity soft magnetic filler having a specific gravity of 4.5 or greater; an intermediate-specific-gravity thermally conductive filler having a specific gravity of 4.0 or less; and a non-liquid anti-thickening and anti-settling agent. Furthermore, a curable grease is a two-component curable grease including a combination of a base compound and a curing agent that are used by being mixed together when used, the curable grease being to be cured by mixing of the base compound with the curing agent. The base compound is a silicone composition of the present invention, in which the liquid silicone is an organopolysiloxane having a vinyl group at an end thereof. The curing agent is a silicone composition of the present invention, in which the liquid silicone is an organohydrogenpolysiloxane.

13 Claims, No Drawings

(51) Int. Cl.

| | | |
|---|---|---|
| *C10N 40/14* | (2006.01) | |
| *C10N 50/10* | (2006.01) | |
| *H01F 1/113* | (2006.01) | |
| *H01F 1/12* | (2006.01) | |
| *H01F 1/33* | (2006.01) | |
| *H01F 1/37* | (2006.01) | |
| *H01F 1/44* | (2006.01) | |

(56) References Cited

U.S. PATENT DOCUMENTS

2008/0258119 A1\* 10/2008 Kobayashi .............. H01Q 17/00
          252/600
2014/0171521 A1   6/2014 Enatsu et al.
2017/0313881 A1\* 11/2017 Watanabe .............. C08K 5/053

FOREIGN PATENT DOCUMENTS

| CN | 102888033 A | 1/2013 |
|---|---|---|
| CN | 103979947 A | 8/2014 |
| CN | 108276773 A | 7/2018 |
| JP | 2001-294752 A | 10/2001 |
| JP | 2002-371138 A | 12/2002 |
| JP | 2002-0374092 A | 12/2002 |
| JP | 3957596 A | 3/2004 |
| WO | WO2005/101942 A1 | 10/2005 |
| WO | WO2013/022090 A1 | 2/2013 |
| WO | WO2016/103424 A1 | 6/2016 |

\* cited by examiner

SILICONE COMPOSITION AND CURABLE GREASE

This application is a national phase entry under 35 U.S.C. § 371 of PCT Patent Application No. PCT/JP2020/013219, filed on Mar. 25, 2020, which claims priority under 35 U.S.C. § 119 to Japanese Patent Application No. 2019-062843, filed Mar. 28, 2019, both of which are incorporated by reference.

TECHNICAL FIELD

The present invention relates to a silicone composition having an electromagnetic wave absorbing property and thermal conductivity and to a curable grease that can be obtained by curing the silicone composition.

BACKGROUND ART

In recent years, there has been an ever-increasing need for high-density packaging, miniaturization, thickness reduction, and weight reduction of heat-generating electronic components. Accordingly, the heat generated by such electronic components is dissipated by using a heat-dissipating member, such as a heat sink. In addition, in some cases, a thermally conductive grease is applied between a heat-generating electronic component and the heat-dissipating member to improve a cooling effect.

Thermally conductive greases, mentioned above, contain silicone rubber, silicone oil, or the like and, therefore, have low thermal conductivity compared with metallic electronic components and metallic heat-dissipating members. Accordingly, a thermally conductive grease having a low viscosity and high fluidity is desired that can be provided between the electronic component and the heat-dissipating member so that the formation of an air layer, which has a very low thermal conductivity, can be prevented. In this regard, there are disclosures intended to improve heat dissipation properties. For example, International Publication No. 2016/103424 (PTL 1) discloses a silicone composition that includes liquid silicone, an insoluble functionalizing filler, which is a thermally conductive filler, and a non-liquid anti-thickening and anti-settling agent. Furthermore, Japanese Patent No. 3957596 (PTL 2) discloses a thermally conductive grease made of 15 to 35 mass % organopolysiloxane; 35 to 55 mass % spherical alumina powder having an average particle diameter of 0.2 μm or greater and less than 1.0 μm; and 30 to 50 mass % aluminum nitride powder having an average particle diameter of 1 to 3 μm and a maximum particle diameter of 2 to 10 μm. The organopolysiloxane includes, as components, 5 to 20 mass % silicone rubber and 10 to 30 mass % silicone oil.

Moreover, for example, regarding CPUs that are used in computers, there is an increasing demand for not only a high level of integration associated with miniaturization but also high-speed processing. The high-speed processing involves a significant increase in the operating frequency, which results in the generation of a high-frequency component. If the high-frequency component becomes noise, and the noise interferes with signals in a communication line or the like, malfunctioning of an electronic device may occur. In association with this, Japanese Unexamined Patent Application Publication No. 2001-294752 (PTL 3) discloses an electromagnetic-wave-absorbing thermally conductive silicone rubber composition, which includes a soft magnetic metal powder and has a thermal conductivity of a cured product of the silicone rubber composition of 2.0 W/m·K or greater. The silicone rubber composition was designed from the standpoint of a heat dissipation property and from the standpoint of suppressing noise generated by an electronic device element, such as a CPU.

CITATION LIST

Patent Literature

PTL 1: International Publication No. 2016/103424
PTL 2: Japanese Patent No. 3957596
PTL 3: Japanese Unexamined Patent Application Publication No. 2001-294752

SUMMARY OF INVENTION

Technical Problem

A high level of integration and high-speed processing are increasingly employed not only for CPUs, mentioned above, but also for other electronic device elements. In particular, in optical communication modules, which have been widely used in recent years, a super-high-frequency component, for example, with a frequency of 10 to 20 GHz, is generated. The frequency is higher than that of a high-frequency component (for example, with a frequency of 10 MHz to 10 GHz) generated by a CPU.

Accordingly, the present invention provides a silicone composition having an electromagnetic wave absorbing property and thermal conductivity. The silicone composition suppresses transmission of not only noise including a high-frequency component (for example, with a frequency of 10 MHz to 10 GHz) but also noise including a super-high-frequency component (for example, with a frequency of 10 to 20 GHz). In addition, the silicone composition has a high degree of heat dissipation property compared with those of the related art. The present invention also provides a curable grease that can be obtained by curing the silicone composition.

Solution to Problem

An aspect of the present invention includes the following features so that the objects described above can be achieved.

Specifically, a silicone composition of an aspect of the present invention includes liquid silicone; a high-specific-gravity soft magnetic filler having a specific gravity of 4.5 or greater; an intermediate-specific-gravity thermally conductive filler having a specific gravity of 4.0 or less; and a non-liquid anti-thickening and anti-settling agent.

The inclusion of the high-specific-gravity soft magnetic filler having a specific gravity of 4.5 or greater enables the silicone composition of the aspect of the present invention to suppress transmission of not only noise including a high-frequency component (for example, with a frequency of 10 MHz to 10 GHz) but also noise including a super-high-frequency component (for example, with a frequency of 10 to 20 GHz). Furthermore, the inclusion of the intermediate-specific-gravity thermally conductive filler having a specific gravity of 4.0 or less enables the silicone composition of the aspect of the present invention to have improved thermal conductivity, and, consequently, the silicone composition has an improved heat dissipation property. In addition, the non-liquid anti-thickening and anti-settling agent included in the silicone composition of the aspect of the present invention suppresses, in the silicone composition, settling of the high-specific-gravity soft magnetic filler and the intermediate-specific-gravity thermally conductive filler, which have a higher specific gravity than the liquid silicone. The suppression of settling of the high-specific-gravity soft magnetic filler and the intermediate-specific-gravity thermally conductive filler enables uniformities of viscosity and a composition of the silicone composition to be maintained, and as a result, thickening is suppressed, transmission of noise including a high-frequency component and noise including a super-high-frequency component is suppressed, and the heat dissipation property is maintained.

In the silicone composition of the aspect of the present invention, the anti-thickening and anti-settling agent may be at least one selected from polysaccharides having a pyranose ring; and nitrogen-containing polysaccharide polymers.

Furthermore, in the silicone composition of the aspect of the present invention, the anti-thickening and anti-settling agent may be at least one selected from crystalline cellulose, cellulose powder, starch, amylose, amylopectin, glycogen, dextrin, chitin, and chitosan.

The polysaccharides, the nitrogen-containing polysaccharide polymers, and the substances mentioned above all have a bulky structure and are insoluble in the liquid silicone, which is relatively hydrophobic. Accordingly, the polysaccharides, the nitrogen-containing polysaccharide polymers, and the substances mentioned above have buoyancy in the liquid silicone. It is inferred that in instances where any of the polysaccharides, the nitrogen-containing polysaccharide polymers, and the substances mentioned above, which have a low specific gravity with respect to the liquid silicone, exists below the high-specific-gravity soft magnetic filler and the intermediate-specific-gravity thermally conductive filler, settling of the high-specific-gravity soft magnetic filler and the intermediate-specific-gravity thermally conductive filler is suppressed. It is inferred that the suppression of settling of the high-specific-gravity soft magnetic filler and the intermediate-specific-gravity thermally conductive filler in the silicone composition enables uniformities of viscosity and a composition of the silicone composition to be maintained, and as a result, thickening is suppressed.

In the silicone composition of the aspect of the present invention, the anti-thickening and anti-settling agent may be crystalline cellulose surface-coated with sodium carboxymethyl cellulose.

It is inferred that an anti-thickening and anti-settling agent made of crystalline cellulose surface-coated with sodium carboxymethyl cellulose, which is relatively hydrophilic, is insoluble in the liquid silicone, which is relatively hydrophobic. In addition, crystalline cellulose itself is a bulky substance and, therefore, has a lower specific gravity than the liquid silicone. Accordingly, crystalline cellulose surface-coated with sodium carboxymethyl cellulose is buoyant in the liquid silicone. Hence, it is inferred that the buoyancy of the crystalline cellulose surface-coated with sodium carboxymethyl cellulose suppresses settling of the high-specific-gravity soft magnetic filler and the intermediate-specific-gravity thermally conductive filler, which have a higher specific gravity than the liquid silicone. Furthermore, it is inferred that the suppression of settling of the high-specific-gravity soft magnetic filler and the intermediate-specific-gravity thermally conductive filler enables uniformities of viscosity and a composition of the silicone composition to be maintained, and as a result, thickening is suppressed.

In the silicone composition of the aspect of the present invention, the anti-thickening and anti-settling agent may include assemblies of crystalline cellulose particles, and the assemblies may have one of a generally spherical shape, a granular shape, a blocky shape, and an aggregate shape.

When the crystalline cellulose particles are assemblies having a shape such as those mentioned above, the anti-thickening and anti-settling agent is bulkier. Accordingly, bulkier assemblies of crystalline cellulose particles have a lower specific gravity than crystalline cellulose primary particles. Hence, it is inferred that settling of the high-specific-gravity soft magnetic filler and the intermediate-specific-gravity thermally conductive filler, which have a higher specific gravity than the liquid silicone, is suppressed by the buoyancy of assemblies of crystalline cellulose particles that exist below. Furthermore, it is inferred that the suppression of settling of the high-specific-gravity soft magnetic filler and the intermediate-specific-gravity thermally conductive filler enables uniformities of viscosity and a composition of the silicone composition to be maintained, and as a result, thickening is suppressed.

In the silicone composition of the aspect of the present invention, the anti-thickening and anti-settling agent may have an average particle diameter of 10 to 500 µm.

When the anti-thickening and anti-settling agent has an average particle diameter within the above-mentioned range, settling of the high-specific-gravity soft magnetic filler and the intermediate-specific-gravity thermally conductive filler, which have a higher specific gravity than the liquid silicone, is suppressed. Note that the average particle diameter will be described later.

In the silicone composition of the aspect of the present invention, the anti-thickening and anti-settling agent may have an angle of repose of 34° to 57°.

The angle of repose depends on a size of the particles, a roundness of an edge of the particles, and a shape of the particles. When the anti-thickening and anti-settling agent has an angle of repose within the above-mentioned range, settling of the high-specific-gravity soft magnetic filler and the intermediate-specific-gravity thermally conductive filler, which have a higher specific gravity than the liquid silicone, is suppressed.

In the silicone composition of the aspect of the present invention, the high-specific-gravity soft magnetic filler may be at least one selected from the group consisting of ferrites, iron, and iron-containing alloys.

The use of at least one selected from the group consisting of ferrites, iron, and iron-containing alloys as the high-specific-gravity soft magnetic filler suppresses not only noise including a high-frequency component (for example, with a frequency of 10 MHz to 10 GHz) but also noise including a super-high-frequency component (for example, with a frequency of 10 to 20 GHz) over a long period of time.

A curable grease of an aspect of the present invention may be a two-component curable grease including a combination of a base compound and a curing agent that are used by being mixed together when used, the curable grease being to be cured by mixing of the base compound with the curing agent. The base compound and the curing agent may be the silicone composition comprising: liquid silicone; a high-specific-gravity soft magnetic filler having a specific gravity of 4.5 or greater; an intermediate-specific-gravity thermally conductive filler having a specific gravity of 4.0 or less; and a non-liquid anti-thickening and anti-settling agent, wherein the liquid silicone of the base compound may be an organopolysiloxane having a vinyl group at an end thereof and the liquid silicone of the curing agent may be an organohydrogenpolysiloxane.

Advantageous Effects of Invention

A silicone composition of an aspect of the present invention suppresses transmission of not only noise including a high-frequency component (for example, with a frequency of 10 MHz to 10 GHz) but also noise including a super-high-frequency component (for example, with a frequency of 10 to 20 GHz), and the silicone composition has an excellent heat dissipation property, compared with silicone compositions of the related art. Furthermore, a curable grease of the present invention also suppresses transmission of noise including a high-frequency component and noise including a super-high-frequency component and has an excellent heat dissipation property, compared with thermally conductive greases of the related art.

DESCRIPTION OF EMBODIMENTS

[Silicone Composition]

The present invention will be described in detail with reference to embodiments. A silicone composition of an embodiment of the present invention includes liquid silicone; a high-specific-gravity soft magnetic filler having a specific gravity of 4.5 or greater; an intermediate-specific-gravity thermally conductive filler having a specific gravity of 4.0 or less; and a non-liquid anti-thickening and anti-settling agent. In this specification, the "high-specific-gravity soft magnetic filler having a specific gravity of 4.5 or greater" may hereinafter be abbreviated as a "high-specific-gravity soft magnetic filler". Likewise, the "intermediate-specific-gravity thermally conductive filler having a specific gravity of 4.0 or less" may be abbreviated as an "intermediate-specific-gravity thermally conductive filler". Furthermore, the "non-liquid anti-thickening and anti-settling agent" may be abbreviated as an "anti-thickening and anti-settling agent".

The inclusion of the high-specific-gravity soft magnetic filler having a specific gravity of 4.5 or greater enables the silicone composition of the embodiment of the present invention to suppress not only noise including a high-frequency component (for example, with a frequency of 10 MHz to 10 GHz) but also noise including a super-high-frequency component (for example, with a frequency of 10 to 20 GHz) over a long period of time. Furthermore, the inclusion of liquid silicone enables the silicone composition of the embodiment of the present invention to have excellent thermal resistance. Furthermore, the inclusion of the intermediate-specific-gravity thermally conductive filler having a specific gravity of 4.0 or less enables the silicone composition of the embodiment of the present invention to have improved thermal conductivity, and, consequently, the silicone composition has an improved heat dissipation property. In addition, the non-liquid anti-thickening and anti-settling agent included in the silicone composition of the embodiment of the present invention suppresses, in the silicone composition, settling of the high-specific-gravity soft magnetic filler and the intermediate-specific-gravity thermally conductive filler, which have a higher specific gravity than the liquid silicone. The suppression of settling of the high-specific-gravity soft magnetic filler and the intermediate-specific-gravity thermally conductive filler enables uniformities of viscosity and a composition of the silicone composition to be maintained; as a result, thickening is suppressed, noise including a high-frequency component and noise including a super-high-frequency component are suppressed over a long period of time, and a heat dissipation property is maintained. That is, the silicone composition of the embodiment of the present invention has an excellent heat dissipation property and electromagnetic wave absorbing property and is capable of maintaining these properties over a long period of time, compared with silicone compositions of the related art.

Now, features of the silicone composition of the embodiment of the present invention will be described in detail.

<Liquid Silicone>

First, the liquid silicone will be described. Examples of liquid silicone that can be used in the embodiment of the present invention include non-curable liquid silicone and curable liquid silicone. Specific examples of the liquid silicone include organopolysiloxanes, such as dimethylpolysiloxane and methylphenyl polysiloxane; and modified silicones substituted with a reactive group, such as an alkenyl group, an epoxy group, an acryloyl group, or an amino group. The liquid silicone is not particularly limited provided that the liquid silicone can be used in applications of the embodiment of the present invention. It is preferable that the liquid silicone be of an addition reaction type, because, for example, high flexibility is desired in applications that involve electromagnetic wave absorption or a heat dissipation property. An amount of curing shrinkage experienced by liquid silicone of an addition reaction type is small, and, therefore, gap formation is unlikely to occur in an instance where such liquid silicone is mounted by being cured between a heat-generating member, such as an electronic device element, and a heat-dissipating member, such as a heat sink.

Examples of the liquid silicone of an addition reaction type include one-component-reaction-type organopolysiloxanes having both a vinyl group and a H—Si group in a molecule; and two-component silicones that include an organopolysiloxane having a vinyl group at an end or a side chain thereof and an organohydrogenpolysiloxane having two or more H—Si groups at ends or side chains thereof. Preferred examples include KE-1057 and KE-1012-A/B (trade names), manufactured by Shin-Etsu Chemical Co., Ltd.; EG-4000 (trade name), manufactured by Dow Corning Toray Co., Ltd.; and SL5100 and SL5152 (trade names), manufactured by KCC Corporation.

In an instance where an organopolysiloxane having a vinyl group is used as the silicone of an addition reaction type, a cured product may be obtained by using, as a curing agent, a silane coupling agent and performing heating to carry out curing. In an instance where an organopolysiloxane having a vinyl group and an organohydrogenpolysiloxane having H—Si groups are used as the silicone of an addition reaction type, a cured product may be obtained by using, as a catalyst, a platinum catalyst, and performing heating to carry out curing.

Examples of the silane coupling agent include vinyl-type silane coupling agents, amino-type silane coupling agents, and epoxy-type silane coupling agents. A preferred reaction-type curing agent for the liquid silicone is a vinyl-type silane coupling agent. For example, KBE-1003 (trade name), manufactured by Shin-Etsu Chemical Co., Ltd., is preferable.

Examples of the platinum catalyst include platinum and platinum compounds. For example, SXR-212 Catalyst, manufactured by Shin-Etsu Chemical Co., Ltd., is preferable.

An amount of addition of the silane coupling agent may be 0.1 to 10 mass % relative to a mass of the liquid silicone. This is preferable from the standpoint of obtaining a cured product having high flexibility. More preferably, the amount of addition is 0.5 to 5 mass %.

Preferably, the liquid silicone has a viscosity of 0.005 Pa·s to 2 Pa·s. If the viscosity of the liquid silicone is less than 0.005 Pa·s, the liquid silicone has a low molecular weight, and, consequently, a molecular weight is unlikely to be high even after curing. As a result, a cured product obtained by curing the silicone composition may be brittle. On the other hand, if the viscosity of the liquid silicone is greater than 2 Pa·s, a viscosity of the silicone composition is likely to increase. Consequently, contents of the high-specific-gravity soft magnetic filler, the intermediate-specific-gravity thermally conductive filler, and the anti-thickening and anti-settling agent may be to be smaller than predetermined amounts so as to ensure that the silicone composition, which is the final product, has a viscosity within a desired range. As a result, a cured product (e.g., a curable grease) resulting from curing of the silicone composition may not have a desired electromagnetic wave absorbing property or thermal conductivity.

<High-Specific-Gravity Soft Magnetic Filler Having Specific Gravity of 4.5 or Greater>

Now, the high-specific-gravity soft magnetic filler having a specific gravity of 4.5 or greater will be described. The high-specific-gravity soft magnetic filler having a specific gravity of 4.5 or greater is included primarily for the purpose of suppressing not only noise including a high-frequency component (for example, with a frequency of 10 MHz to 10 GHz) but also noise including a super-high-frequency component (for example, with a frequency of 10 to 20 GHz). As referred to in this specification, the specific gravity is a value obtained by dividing a density of a target object by 1.0 g/cm$^3$, which is a density of water.

The high-specific-gravity soft magnetic filler is not particularly limited provided that the filler has a soft magnetic property. As used herein, the term "soft magnetic property" refers to a property in which, when a magnetic field is applied from the outside, internal magnetization is likely to be aligned with the direction of the magnetic field, that is, a tendency to be magnetized. Note that a "hard magnetic property" is a property of not being susceptible to internal magnetization even when an external magnetic field is applied and being able to create an external magnetic field.

Examples of the high-specific-gravity soft magnetic filler include ferrites, iron, and iron-containing alloys. These soft magnetic metal powders may be used alone or in a combination of two or more. Examples of the iron-containing alloys include alloys such as Fe—Ni (permalloy), Fe—Co, Fe—Cr, Fe—Si, Fe—Al, Fe—Cr—Si, Fe—Cr—Al, and Fe—Al—Si.

Ferrites have a specific gravity of 4.5 to 6.0. Ferrites are compounds (MO·Fe$_2$O$_3$) of iron (III) oxide (Fe$_2$O$_3$) and a divalent metal oxide (MO). Based on the type of the divalent metal oxide, ferrites can be classified into the following types: spinel-type ferrites, such as Mn—Zn systems, Mg—Zn systems, Ni—Zn systems, Cu systems, Cu—Zn systems, Cu—Zn—Mg systems, Cu—Ni—Zn systems, and Li—Fe systems; garnet-type ferrites, such as YFe systems represented by R$_3$Fe$_5$O$_{12}$ (R is a trivalent Y or a rare earth metal); and ferroxplana-type ferrites, such as BaFe systems having a hexagonal structure in which the compositions of MeO, BaO, and Fe$_2$O$_3$ are combined, where Me is Fe, Ni, Co, or Cu.

Among these, ferrites containing Ni, Mn, Zn, Y, and/or Ba are preferable. In particular, spinel types, such as Mn—Zn systems and Ni—Zn systems, and ferroxplana types, such as BaFe systems, are preferable. Using any of these increases permeability.

The Ni—Zn system ferrite has a composition represented by a general formula of (NiO)x(ZnO)y·Fe$_2$O$_3$. The Ni—Zn system ferrite may be one in which Ni is partially replaced with another divalent metal, such as Cu, Mg, Co, or Mn. The Ni—Zn system ferrite may contain an additional element to such an extent that intrinsic characteristics of the ferrite are not impaired.

The Mg—Zn system ferrite has a composition represented by a general formula of (MgO)x(ZnO)y·Fe$_2$O$_3$. The Mg—Zn system ferrite may be one in which Mg is partially replaced with another divalent metal, such as Ni, Cu, Co, or Mn. The Mg—Zn system ferrite may contain an additional element to such an extent that intrinsic characteristics of the ferrite are not impaired.

The Mn—Zn system ferrite has a composition represented by a general formula of (MnO)x(ZnO)y·Fe$_2$O$_3$. The Mn—Zn system ferrite may be one in which Mn is partially replaced with another divalent metal, such as Ni, Cu, Co, or Mg. The Mn—Zn system ferrite may contain an additional element to such an extent that intrinsic characteristics of the ferrite are not impaired.

The Cu system ferrite has a composition represented by a general formula of (CuO)x·Fe$_2$O$_3$. The Cu system ferrite may be one in which Cu is partially replaced with another divalent metal, such as Ni, Zn, Mg, Co, or Mn. The Cu system ferrite may contain an additional element to such an extent that intrinsic characteristics of the ferrite are not impaired.

The ferrite used in the embodiment can be prepared by using a method known in the art. Examples of representative raw materials of the ferrite, which is an oxide-based magnetic material, include metal oxides, such as Fe$_2$O$_3$, MnO$_2$, MnCO$_3$, CuO, NiO, MgO, ZnO, Y$_2$O, and BaO; and metal carbonate salts. Representative methods for producing a soft magnetic ferrite are dry methods, coprecipitation methods, and spray pyrolysis methods.

A particle shape of the high-specific-gravity soft magnetic filler is not particularly limited. The particle shape may be a spherical shape, a granular shape, or an irregular shape or may be one having a shape anisotropy, examples of which include needle shapes, rod shapes, flat cylindrical shapes, and hollow shapes. It is preferable that the particle shape of the high-specific-gravity soft magnetic filler be a shape with a low shape anisotropy so as to avoid an increase in viscosity of the silicone composition that includes the filler. An aspect ratio of the high-specific-gravity soft magnetic filler with a low shape anisotropy is preferably 1.0 to 10.0 and more preferably 1.0 to 5.0.

One high-specific-gravity soft magnetic filler may be used alone, or two or more high-specific-gravity soft magnetic fillers may be used in combination. An average particle diameter of the high-specific-gravity soft magnetic filler is the value (volume mean diameter MV) of the 50% diameter in a volume-based cumulative fraction, as measured by a laser diffraction/scattering particle size distribution analyzer. In an instance where the high-specific-gravity soft magnetic filler has a flat shape, the average particle diameter is preferably 0.1 to 500 μm and more preferably 10 to 300 μm. On the other hand, in an instance where the high-specific-gravity soft magnetic filler has a generally spherical shape, the average particle diameter is preferably 0.1 to 300 μm and more preferably 10 to 200 μm. If the average particle diameter falls below the ranges, the effect of suppressing noise including a high-frequency component and noise including a super-high-frequency component is small. If the average particle diameter is above the ranges, suppression of settling cannot be easily achieved with the non-liquid anti-thickening and anti-settling agent, which will be described later. Furthermore, a surface of the high-specific-gravity soft magnetic filler may be surface-treated with, for instance, an insulating coating and/or a silane coupling agent. In such cases, the high-specific-gravity soft magnetic filler has enhanced dispersibility in the liquid silicone, and the resulting silicone composition has an enhanced electromagnetic wave absorbing property.

The average particle diameters disclosed in this specification are average particle diameters measured by a laser diffraction light scattering method (JIS R1629:1997) in a laser diffraction/scattering particle size distribution analyzer. With this measurement method, the average particle diameters of the powders of the high-specific-gravity soft magnetic filler, the intermediate-specific-gravity thermally conductive filler, and the non-liquid anti-thickening and anti-settling agent, which are used in the present invention, were measured.

A content of the high-specific-gravity soft magnetic filler is preferably 200 to 1500 parts by mass, more preferably 300 to 1200 parts by mass, and even more preferably 350 to 1100 parts by mass, per 100 parts by mass of the liquid silicone. If the content of the high-specific-gravity soft magnetic filler is less than the above-mentioned ranges, a sufficient magnetic property may not be obtained. If the content is greater than the above-mentioned ranges, the silicone composition may have poor formability after being cured.

<Intermediate-Specific-Gravity Thermally Conductive Filler Having Specific Gravity of 4.0 or Less>

Now, the intermediate-specific-gravity thermally conductive filler having a specific gravity of 4.0 or less will be described. The intermediate-specific-gravity thermally conductive filler is included primarily for the purpose of improving the heat dissipation property of the silicone composition of the embodiment of the present invention.

Examples of the intermediate-specific-gravity thermally conductive filler having a specific gravity of 4.0 or less include aluminum, aluminum oxide, magnesium oxide, quartz, boron nitride, aluminum nitride, silicon carbide, aluminum hydroxide, graphite, and carbon fibers. Preferably, the specific gravity of the intermediate-specific-gravity thermally conductive filler is less than or equal to 3.0. Examples of the intermediate-specific-gravity thermally conductive filler having a specific gravity of 3.0 or less include aluminum, aluminum hydroxide, quartz, graphite, and carbon fibers. The lower the specific gravity of the intermediate-specific-gravity thermally conductive filler, the less likely the intermediate-specific-gravity thermally conductive filler is to settle in the silicone composition. In the present invention, the intermediate-specific-gravity thermally conductive fillers mentioned above may be used alone or in a combination of two or more.

It is preferable that the average particle diameter of the intermediate-specific-gravity thermally conductive filler be 0.3 to 200 μm. The average particle diameter of the intermediate-specific-gravity thermally conductive filler is an average particle diameter measured by the above-described measurement method for an average particle diameter in accordance with JIS R1629:1997. If the average particle diameter of the intermediate-specific-gravity thermally conductive filler is less than 0.3 μm, the viscosity of the silicone composition is significantly increased. Accordingly, the intermediate-specific-gravity thermally conductive filler cannot be highly loaded, and, therefore, a silicone composition having a desired thermal conductivity cannot be obtained. On the other hand, if the average particle diameter of the intermediate-specific-gravity thermally conductive filler is greater than 200 μm, a settling velocity may not be sufficiently slowed even with the settling suppression function of the non-liquid anti-thickening and anti-settling agent, which will be described later. Two or more intermediate-specific-gravity thermally conductive fillers having different average particle diameters may be used in combination. This increases a filling ratio in the silicone composition.

It is preferable that a shape of the intermediate-specific-gravity thermally conductive filler be a spherical shape or a nearly polyhedral spherical shape. When the shape is a spherical shape or a nearly polyhedral spherical shape, a specific surface area of the intermediate-specific-gravity thermally conductive filler can be reduced compared with other shapes. When the specific surface area of the intermediate-specific-gravity thermally conductive filler is low, fluidity of the silicone composition is unlikely to decrease even when a large-diameter intermediate-specific-gravity thermally conductive filler is present in the entirety of the intermediate-specific-gravity thermally conductive filler, and a proportion thereof is increased. In addition, in some instances, the thermal conductivity can be enhanced by increasing a content of the intermediate-specific-gravity thermally conductive filler, while maintaining a desired viscosity of the silicone composition.

It is preferable that the content of the intermediate-specific-gravity thermally conductive filler be within a range of 200 to 1500 parts by mass per 100 parts by mass of the liquid silicone. If the content of the intermediate-specific-gravity thermally conductive filler is less than 200 parts by mass, the silicone composition cannot exhibit sufficient thermal conductivity. On the other hand, if the content of the intermediate-specific-gravity thermally conductive filler is greater than 1500 parts by mass, the viscosity of the silicone composition is excessively increased, and as a result, the operation of applying the silicone composition may become difficult.

<Non-Liquid Anti-Thickening and Anti-Settling Agent>

Now, the non-liquid anti-thickening and anti-settling agent will be described. The anti-thickening and anti-settling agent used herein has a function of inhibiting an increase in viscosity of the system, which is achieved by the addition of the anti-thickening and anti-settling agent, and, accordingly, preventing settling of the high-specific-gravity soft magnetic filler and the intermediate-specific-gravity thermally conductive filler, particularly settling of the high-specific-gravity soft magnetic filler. Unlike common low-viscosity liquids for reducing viscosity, the non-liquid anti-thickening and anti-settling agent exists in a non-liquid form, such as a solid form or a gel form, in the silicone composition in which the non-liquid anti-thickening and anti-settling agent is included.

Examples of the anti-thickening and anti-settling agent include polysaccharides having a pyranose ring; and nitrogen-containing polysaccharide polymers. Specific examples of the anti-thickening and anti-settling agent include crystalline cellulose, cellulose powders, starch, amylose, amylopectin, glycogen, dextrin, chitin, and chitosan. Amylose has a structure in which a large number of α-glucose units are linked (condensation-polymerized). Amylose has a linear configuration. Amylopectin has a structure in which a large number of OG-glucose units are linked (condensation-polymerized). Amylopectin is branched. Glycogen is branched to a greater degree. Starch has a helix structure in which amylose is enclosed in amylopectin. Dextrin has a structure in which a large number of OG-glucose units are linked (condensation-polymerized). Chitin and chitosan have a polyglucosamine structure and a linear configuration.

In the embodiment of the present invention, the anti-thickening and anti-settling agents mentioned above may be used alone or in a combination of two or more. Cellulose compounds, which are polysaccharides, have excellent moisture resistance and are preferable in this regard, too. A preferred anti-thickening and anti-settling agent to be used in the embodiment of the present invention is crystalline cellulose surface-coated with sodium carboxymethyl cellulose.

In particular, although crystalline cellulose is non-liquid, crystalline cellulose is unlikely to cause an increase in viscosity of the liquid silicone. The crystalline cellulose can be obtained as follows; α-cellulose obtained as a pulp from a fibrous plant is depolymerized with acid, and the resulting microcrystalline cellulose is refined. A large number of cellulose crystalline domains are present, and cellulose molecular chains exist densely and regularly. The crystalline cellulose may be dried as it is and processed into a powder, or, as described above, the crystalline cellulose may be surface-coated with a water-soluble polymer (a polysaccharide, a saccharide, or the like), subsequently dried, and processed into a powder. In particular, crystalline cellulose surface-coated with sodium carboxymethyl cellulose (CMC·Na) has a large effect in suppressing settling of the high-specific-gravity soft magnetic filler and the intermediate-specific-gravity thermally conductive filler in the liquid silicone. This is because such crystalline cellulose constitutes secondary aggregates of crystalline cellulose, which are bulky.

A degree of crystallization of the crystalline cellulose is preferably 70 to 90 and more preferably 80 to 90. The degree of crystallization of cellulose is affected primarily by the raw material pulp and the production method. Powder cellulose produced only by mechanical processing, without performing an acid treatment, has a low degree of crystallization. If the degree of crystallization is low, a long period of time is necessary for the heating and vulcanization, which reduces operability, and in addition, mechanical properties deteriorate. It has been found that when the degree of crystallization is 80 or greater, a vulcanization rate is substantially not affected.

The mechanism by which the anti-thickening and anti-settling agent prevents settling is unknown. The polysaccharides, the nitrogen-containing polysaccharide polymers, and the substances mentioned above all have a bulky structure and are insoluble in the liquid silicone, which is relatively hydrophobic. Thus, the polysaccharides, the nitrogen-containing polysaccharide polymers, and the substances mentioned above have buoyancy in the liquid silicone. Hence, it is inferred that in instances where any of the anti-thickening and anti-settling agents exists below the high-specific-gravity soft magnetic filler and the intermediate-specific-gravity thermally conductive filler, the anti-thickening and anti-settling agent exhibits buoyancy, thereby suppressing settling of the high-specific-gravity soft magnetic filler and the intermediate-specific-gravity thermally conductive filler. In addition, it is inferred that the suppression of settling of the high-specific-gravity soft magnetic filler and the intermediate-specific-gravity thermally conductive filler in the silicone composition enables uniformities of viscosity and a composition of the silicone composition to be maintained, which suppresses thickening of the silicone composition.

Furthermore, the anti-thickening and anti-settling agent may include assemblies of crystalline cellulose particles, and the assemblies may have one of a generally spherical shape, a granular shape, a blocky shape, and an aggregate shape, so that settling of the high-specific-gravity soft magnetic filler and the intermediate-specific-gravity thermally conductive filler can be suppressed. When the anti-thickening and anti-settling agent includes assemblies having one of the shapes mentioned above, the anti-thickening and anti-settling agent is bulkier and has a lower specific gravity. Accordingly, it is inferred that the assemblies of the crystalline cellulose particles, which have a low specific gravity with respect to the liquid silicone, suppress settling of the high-specific-gravity soft magnetic filler and the liquid silicone located above, in the liquid silicone, by exhibiting the buoyancy of the assemblies of the crystalline cellulose particles.

The average particle diameter of the anti-thickening and anti-settling agent is preferably 0.1 to 500 μm, more preferably 10 to 500 μm, and even more preferably 20 to 500 μm. The average particle diameter of the anti-thickening and anti-settling agent is an average particle diameter measured by the above-described measurement method for an average particle diameter in accordance with JIS R1629:1997. If the average particle diameter of the anti-thickening and anti-settling agent is less than 0.1 μm, the suppression of settling, particularly settling of the high-specific-gravity soft magnetic filler, becomes insufficient. On the other hand, if the average particle diameter of the anti-thickening and anti-settling agent is greater than 500 μm, the viscosity of the silicone composition may increase.

An angle of repose of the anti-thickening and anti-settling agent is preferably 34° to 57°, more preferably 34° to 52°, and even more preferably 34° to 48°. The angle of repose is an angle of repose measured in accordance with JIS R 9301-2-2:1999 (ISO 902:1976). When the angle of repose of the anti-thickening and anti-settling agent is less than 34°, a falling speed of the powder is high, which improves powder flowability and, therefore, enhances operability, but powder swirling, for instance, tends to occur. On the other hand, if the angle of repose of the anti-thickening and anti-settling agent is greater than 57°, the powder flowability is poor, which is unfavorable for operation.

A content of the anti-thickening and anti-settling agent is preferably 1.0 to 50 parts by mass, more preferably 3.0 to 30 parts by mass, and even more preferably 5.0 to 20 parts by mass, per 100 parts by mass of the liquid silicone. If the content of the anti-thickening and anti-settling agent is less than 2.0 parts by mass, the settling prevention effect cannot be produced. On the other hand, if the content of the anti-thickening and anti-settling agent is greater than 50 parts by mass, an amount of the anti-thickening and anti-settling agent in the silicone composition is excessive, which may reduce the thermal conductivity. The anti-thickening and anti-settling agent of the present embodiment may be a polysaccharide having a pyranose ring; and/or a nitrogen-containing polysaccharide polymer. Alternatively or additionally, the anti-thickening and anti-settling agent may be a different powdery anti-settling agent, such as micronized silica, organo-treated clay, or organo-treated bentonite.

<Other Additives>

The silicone composition having the composition described above may include any of a variety of additives to such an extent that the functions of the silicone composition are not impaired. Examples of additives that may be appropriately added include dispersing agents, flame retardants, coupling agents, plasticizing agents, curing retarders, antioxidants, coloring agents, and catalysts.

By mixing the components described above and thoroughly stirring the mixture, the silicone composition can be obtained.

It is preferable that the silicone composition resulting from the stirring have a viscosity of 30 Pa·s to 700 Pa·s at 23° C. If the viscosity of the silicone composition is less than 30 Pa·s, the contents of the high-specific-gravity soft magnetic filler and the intermediate-specific-gravity thermally conductive filler are low, and as a result, sufficient thermal conductivity and a sufficient electromagnetic wave absorbing property may not be achieved. On the other hand, if the viscosity of the silicone composition is greater than 700 Pa·s, the operation of applying the silicone composition becomes difficult. Note that, as will be described later, the viscosity is a viscosity measured by using a viscometer (a Brookfield rotational viscometer DV-E (product name)) with a rotating element (spindle No. SC4-14), at rotational speeds of 5 rpm and 10 rpm and a measurement temperature of 23° C.

[Curable Grease]

A curable grease of an embodiment of the present invention is a two-component curable grease including a combination of a base compound and a curing agent that are used by being mixed together when used, the curable grease being to be cured by mixing of the base compound with the curing agent. The base compound is the silicone composition described above, in which the liquid silicone is an organopolysiloxane having a vinyl group at an end thereof. The curing agent is the silicone composition described above, in which the liquid silicone is an organohydrogenpolysiloxane having two or more H—Si groups at ends or side chains thereof.

Note that since the base compound and the curing agent used in the curable grease are described above, descriptions thereof are omitted here.

Examples

Now, the embodiments of the present invention will be described in further detail with reference to examples (comparative examples).

<Preparation of Samples>

Sample 1-1:

A silicone composition 1A (base compound) was prepared by mixing the following materials together with stirring in a planetary mixer: 100 parts by mass of a vinyl-terminated organopolysiloxane (KE-1012-A (trade name), manufactured by Shin-Etsu Chemical Co., Ltd., a specific gravity of 1), which is liquid silicone of an addition reaction type and was used as liquid silicone 1; 760 parts by mass of a soft magnetic Ni—Zn ferrite (an average particle diameter of 80 μm and a specific gravity of 5.18), which was used as a high-specific-gravity soft magnetic filler; 200 parts by mass of spherical alumina 1 (an average particle diameter of 4.5 μm and a specific gravity of 3.94), 100 parts by mass of spherical alumina 2 (an average particle diameter of 3 μm and a specific gravity of 3.94), 80 parts by mass of α-alumina single crystal particles having a nearly polyhedral spherical shape (an average particle diameter of 0.5 μm and a specific gravity of 3.94), and 40 parts by mass of aluminum hydroxide (an average particle diameter of 1 μm and a specific gravity of 2.4), which were used as intermediate-specific-gravity thermally conductive fillers; 1 part by mass of a vinylsilane coupling agent (a specific gravity of 1); 0.3 parts by mass of a platinum catalyst (a specific gravity of 1); and 6 parts by mass of crystalline cellulose (an average particle diameter of 21 μm) surface-coated with sodium carboxymethyl cellulose, which was used as an anti-thickening and anti-settling agent 1.

Sample 1-2:

A silicone composition 1B (curing agent) was prepared by performing mixing in a manner similar to that for sample 1-1, except that 100 parts by mass of an organohydrogenpolysiloxane (KE-1012-B (trade name), manufactured by Shin-Etsu Chemical Co., Ltd., a specific gravity of 1) having two or more H—Si groups at ends thereof, which is liquid silicone of an addition reaction type, was included as liquid silicone 2 instead of the liquid silicone 1, which was used in sample 1; and no platinum catalyst was included.

The silicone composition 1A (base compound) of sample 1-1 and the silicone composition 1B (curing agent) of sample 1-2 served as a two-component curable grease that can be cured by mixing the silicone compositions together and allowing the mixture to stand for approximately 24 hours, as will be described later. The base compound may be referred to as an "agent A", and the curing agent may be referred to as an "agent B".

Sample 2-1:

As sample 2-1, a silicone composition 2A was prepared by performing mixing in a manner similar to that for sample 1-1, except that the content of the crystalline cellulose surface-coated with sodium carboxymethyl cellulose used as the anti-thickening and anti-settling agent 1 in sample 1-1 was changed from 6 parts by mass to 12 parts by mass.

Sample 2-2:

As sample 2-2, a silicone composition 2B was prepared by performing mixing in a manner similar to that for sample 1-2, except that the content of the crystalline cellulose surface-coated with sodium carboxymethyl cellulose used as the anti-thickening and anti-settling agent 1 in sample 1-2 was changed from 6 parts by mass to 12 parts by mass.

The silicone composition 2A of sample 2-1 and the silicone composition 2B of sample 2-2 served as a two-component curable grease that can be cured by mixing the silicone compositions together and allowing the mixture to stand for approximately 24 hours, as will be described later.

Samples 3-1, 4-1:

As samples 3-1 and 4-1, silicone compositions 3A and 4A were prepared by performing mixing in a manner similar to that for sample 1-1, except that, instead of the anti-thickening and anti-settling agent 1 used in sample 1-1, a fumed mixed oxide (Aerosil® COK 84 (trade name), manufactured by Nippon Aerosil Co., Ltd., a mixture of $SiO_2$ and $Al_2O_3$) was used as an anti-thickening and anti-settling agent 2; the contents of the fumed mixed oxide were as shown in Table 2 (1.7 parts by weight and 3.4 parts by weight).

Samples 3-2, 4-2:

As samples 3-2 and 4-2, silicone compositions 3B and 4B were prepared by performing mixing in a manner similar to that for sample 1-2, except that, instead of the anti-thickening and anti-settling agent 1 used in sample 1-2, the fumed mixed oxide (Aerosil® COK 84 (trade name), manufactured by Nippon Aerosil Co., Ltd., a mixture of $SiO_2$ and $Al_2O_3$) was used as the anti-thickening and anti-settling agent 2; the contents of the fumed mixed oxide were as shown in Table 2 (1.7 parts by weight and 3.4 parts by weight).

The silicone compositions 3A and 4A of samples 3-1 and 4-1 and the silicone compositions 3B and 4B of samples 3-2 and 4-2 respectively served as two-component curable greases that can be cured by mixing the silicone compositions together and allowing the mixture to stand for approximately 24 hours, as will be described later.

Comparative Samples 1-1, 1-2:

As comparative sample 1-1, a silicone composition 1A' was prepared by performing mixing in a manner similar to that for sample 1-1, except that the anti-thickening and anti-settling agent 1 used in sample 1-1 was not added. Furthermore, as comparative sample 1-2, a silicone composition 1B' was prepared by performing mixing in a manner similar to that for sample 1-2, except that the anti-thickening and anti-settling agent 1 used in sample 1-2 was not added.

The silicone composition 1A' of comparative sample 1-1 and the silicone composition 1B' of comparative sample 1-2 served as a two-component curable grease that can be cured by mixing the silicone compositions together and allowing the mixture to stand for approximately 24 hours, as will be described later.

Samples 5-1, 5-2:

As sample 5-1, a silicone composition 5A was prepared by performing mixing in a manner similar to that for sample 1-1, except that, instead of the anti-thickening and anti-settling agent 1 used in sample 1-1, 1 part by weight of an alkyl quaternary ammonium clay (Garamite-7303 (trade name), manufactured by BYK Additives & Instruments) was included as an anti-thickening and anti-settling agent 3.

As sample 5-2, a silicone composition 5B was prepared by performing mixing in a manner similar to that for sample 1-2, except that, instead of the anti-thickening and anti-settling agent 1 used in sample 1-2, 1 part by weight of the alkyl quaternary ammonium clay (Garamite-7303 (trade name), manufactured by BYK Additives & Instruments) was included.

Samples 6-1, 6-2:

As sample 6-1, a silicone composition 6A was prepared by performing mixing in a manner similar to that for sample 1-1, except that, instead of the anti-thickening and anti-settling agent 1 used in sample 1-1, 6 parts by weight of a cellulose powder (an average particle diameter of 50 μm and an angle of repose of 57°) containing elongated particles was included as an anti-thickening and anti-settling agent 4.

As sample 6-2, a silicone composition 6B was prepared by performing mixing in a manner similar to that for sample 1-2, except that, instead of the anti-thickening and anti-settling agent 1 used in sample 1-2, 6 parts by weight of the cellulose powder (an average particle diameter of 50 μm and an angle of repose of 57°) containing elongated particles was included as the anti-thickening and anti-settling agent 4.

Samples 7-1, 7-2:

As sample 7-1, a silicone composition 7A was prepared by performing mixing in a manner similar to that for sample 1-1, except that, instead of the anti-thickening and anti-settling agent 1 used in sample 1, 6 parts by weight of a cellulose powder (an average particle diameter of 100 μm and an angle of repose of 34°) having a circular shape was included as an anti-thickening and anti-settling agent 5.

As sample 7-2, a silicone composition 7B was prepared by performing mixing in a manner similar to that for sample 1-2, except that, instead of the anti-thickening and anti-settling agent 1 used in sample 1, 6 parts by weight of the cellulose powder (an average particle diameter of 100 μm and an angle of repose of 34°) having a circular shape was included as the anti-thickening and anti-settling agent 5.

Samples 8-1, 8-2:

As sample 8-1, a silicone composition 8A was prepared by performing mixing in a manner similar to that for sample 1-1, except that, instead of the anti-thickening and anti-settling agent 1 used in sample 1-1, 6 parts by weight of starch (corn starch) (an average particle diameter of 500 μm and an angle of repose of 48°) was included as an anti-thickening and anti-settling agent 6.

As sample 8-2, a silicone composition 8B was prepared by performing mixing in a manner similar to that for sample 1-2, except that, instead of the anti-thickening and anti-settling agent 1 used in sample 1-2, 6 parts by weight of the starch (corn starch) (an average particle diameter of 500 μm and an angle of repose of 48°) was included as the anti-thickening and anti-settling agent 6.

Samples 9-1, 9-2:

As sample 9-1, a silicone composition 9A was prepared by performing mixing in a manner similar to that for sample 1-1, except that, instead of the anti-thickening and anti-settling agent 1 used in sample 1-1, 6 parts by weight of chitosan (an average particle diameter of 180 μm and an angle of repose of 52°) was included as an anti-thickening and anti-settling agent 7.

As sample 9-2, a silicone composition 9B was prepared by performing mixing in a manner similar to that for sample 1-2, except that, instead of the anti-thickening and anti-settling agent 1 used in sample 1-2, 6 parts by weight of the chitosan (an average particle diameter of 180 μm and an angle of repose of 52°) was included as the anti-thickening and anti-settling agent 7.

The silicone compositions 5A, 6A, 7A, 8A, and 9A of samples 5-1, 6-1, 7-1, 8-1, and 9-1 and the silicone compositions 5B, 6B, 7B, 8B, and 9B of samples 5-2, 6-2, 7-2, 8-2, and 9-2 respectively served as two-component curable greases that can be cured by mixing the silicone compositions together and allowing the mixture to stand for approximately 24 hours, as will be described later.

Sample 10-1:

As sample 10-1, a silicone composition 10A (base compound) was prepared by performing mixing in a manner similar to that for comparative sample 1-1, except that 1400 parts by mass of martensitic stainless steel that was an Fe—Cr system iron alloy (12.5% Cr, an average particle diameter of 10 μm and a specific gravity of 7.6) was used as a high-specific-gravity soft magnetic filler 1; and 200 parts by mass of spherical alumina 3 (an average particle diameter of 70 μm and a specific gravity of 3.94), 80 parts by mass of OG-alumina single crystal particles having a nearly polyhedral spherical shape (an average particle diameter of 0.5 μm and a specific gravity of 3.94), and 40 parts by mass of aluminum hydroxide (an average particle diameter of 1 μm and a specific gravity of 2.4) were alternatively used as intermediate-specific-gravity thermally conductive fillers.

Sample 10-2:

As sample 10-2, a silicone composition 10B (curing agent) was prepared by performing mixing in a manner similar to that for sample 10-1, except that 100 parts by mass of the organohydrogenpolysiloxane (KE-1012-B (trade name), manufactured by Shin-Etsu Chemical Co., Ltd., a specific gravity of 1) having two or more H—Si groups at ends thereof, which is liquid silicone of an addition reaction type, was included as the liquid silicone 2 instead of the liquid silicone 1, which was used in sample 10-1; and no platinum catalyst was included.

The silicone composition 10A (base compound) of sample 10-1 and the silicone composition 10B (curing agent) of sample 10-2 served as a two-component curable grease that can be cured by mixing the silicone compositions together and allowing the mixture to stand for approximately 24 hours, as will be described later.

Sample 11-1:

As sample 11-1, a silicone composition 11A (base compound) was prepared by performing mixing in a manner similar to that for sample 1-1, except that 1400 parts by mass of martensitic stainless steel that was an Fe—Cr system iron alloy (12.5% Cr, an average particle diameter of 10 μm and a specific gravity of 7.6) was used as a high-specific-gravity soft magnetic filler 1; and 200 parts by mass of spherical alumina 3 (an average particle diameter of 70 μm and a specific gravity of 3.94), 80 parts by mass of α-alumina single crystal particles having a nearly polyhedral spherical shape (an average particle diameter of 0.5 μm and a specific gravity of 3.94), and 40 parts by mass of aluminum hydroxide (an average particle diameter of 1 μm and a specific gravity of 2.4) were alternatively used as intermediate-specific-gravity thermally conductive fillers.

Sample 11-2:

As sample 11-2, a silicone composition 11B (curing agent) was prepared by performing mixing in a manner similar to that for sample 11-1, except that 100 parts by mass of the organohydrogenpolysiloxane (KE-1012-B (trade name), manufactured by Shin-Etsu Chemical Co., Ltd., a specific gravity of 1) having two or more H—Si groups at ends thereof, which is liquid silicone of an addition reaction type, was included as the liquid silicone 2 instead of the liquid silicone 1, which was used in sample 11-1; and no platinum catalyst was included.

The silicone composition 11A (base compound) of sample 11-1 and the silicone composition 11B (curing agent) of sample 11-2 served as a two-component curable grease that can be cured by mixing the silicone compositions together and allowing the mixture to stand for approximately 24 hours, as will be described later.

Sample 12-1:

As sample 12-1, a silicone composition 12A (base compound) was prepared by performing mixing in a manner similar to that for comparative sample 1-1, except that 1020 parts by mass of stainless steel that was an Fe—Si—Cr system iron alloy (3.5% Si, 4.5% Cr, insulation-coated, an average particle diameter of 11 μm, and a specific gravity of 7.2) was alternatively used as a high-specific-gravity soft magnetic filler 2.

Sample 12-2:

As sample 12-2, a silicone composition 12B (curing agent) was prepared by performing mixing in a manner similar to that for sample 12-1, except that 100 parts by mass of the organohydrogenpolysiloxane (KE-1012-B (trade name), manufactured by Shin-Etsu Chemical Co., Ltd., a specific gravity of 1) having two or more H—Si groups at ends thereof, which is liquid silicone of an addition reaction type, was included as the liquid silicone 2 instead of the liquid silicone 1, which was used in sample 12-1; and no platinum catalyst was included.

The silicone composition 12A (base compound) of sample 12-1 and the silicone composition 12B (curing agent) of sample 12-2 served as a two-component curable grease that can be cured by mixing the silicone compositions together and allowing the mixture to stand for approximately 24 hours, as will be described later.

Sample 13-1:

As sample 13-1, a silicone composition 13A (base compound) was prepared by performing mixing in a manner similar to that for comparative sample 11-1, except that 1020 parts by mass of stainless steel that was an Fe—Si—Cr system iron alloy (3.5% Si, 4.5% Cr, insulation-coated, an average particle diameter of 11 μm, and a specific gravity of 7.2) was alternatively used as the high-specific-gravity soft magnetic filler 2.

Sample 13-2:

As sample 13-2, a silicone composition 13B (curing agent) was prepared by performing mixing in a manner similar to that for sample 13-1, except that 100 parts by mass of the organohydrogenpolysiloxane (KE-1012-B (trade name), manufactured by Shin-Etsu Chemical Co., Ltd., a specific gravity of 1) having two or more H—Si groups at ends thereof, which is liquid silicone of an addition reaction type, was included as the liquid silicone 2 instead of the liquid silicone 1, which was used in sample 13-1; and no platinum catalyst was included.

The silicone composition 13A (base compound) of sample 13-1 and the silicone composition 13B (curing agent) of sample 13-2 served as a two-component curable grease that can be cured by mixing the silicone compositions together and allowing the mixture to stand for approximately 24 hours, as will be described later.

<Measurement Methods, Tests, and Evaluations>

Measurement of Viscosity:

The viscosity (Pa·s) was measured by using a viscometer (a Brookfield rotational viscometer DV-E (product name)) with a rotating element (spindle No. SC4-14), at rotational speeds of 5 rpm and 10 rpm and a measurement temperature of 23° C. The results are shown in Tables 1 to 3. For sample 10-1, sample 11-1, sample 12-1, and sample 13-1, the measurement was performed only at a rotational speed of 10 rpm. The results are shown in Table 4.

Settling Test and Evaluation:

Each of the silicone compositions that served as sample 1-1 to sample 13-2 was loaded into a cylindrical container having a diameter of 20 mm and a height of 120 mm such that the silicone compositions reached a height of 100 mm. The container was allowed to stand undisturbed in an environment at 60° C. for 1000 hours, and thereafter, the degree of settling of the fillers was visually examined.

The degree of settling of each of the samples was evaluated by using the following five grades. The results are shown in Tables 1 to 4.

5: No separation was observed.

4: No separation was observed, but the surface looked smooth (the concentration of the liquid silicone was increased, and the particles of the thermally conductive filler appeared to be reduced, on the surface)

3: No separation was observed, but a thin film of the liquid silicone covered the surface (there were no particles of the thermally conductive filler at least on the surface).

2: Separation occurred to such an extent that the liquid silicone flowed when the container was tilted (a thickness of the separated portion of the liquid silicone was 1 mm or greater and less than 5 mm).

1: A thickness of the separated portion of the liquid silicone was 5 mm or greater.

Degree of Oil Separation:

The silicone compositions that served as sample 1-1 to sample 13-2 were subjected to a measurement of a degree of oil separation (%) after the compositions were allowed to stand at 100° C. for 168 hours. The measurement was performed in accordance with JIS K 2220:2013.

Thermal Conductivity:

By using the silicone compositions that served as sample 1-1 to sample 13-2, mixture compositions that constituted curable greases of sample 1 to sample 13 were each prepared as follows: silicone compositions of samples designated with the suffix "-1" were each used as the agent A, silicone compositions of samples designated with the suffix "-2" were each used as the agent B, and the agent A and the agent B were mixed together and allowed to stand at 25° C. for 24 hours. Each of the mixture compositions was formed into a sheet having a thickness of 20 mm, and thus, a test specimen for measuring a thermal conductivity was prepared. Each of the test specimens was subjected to a measurement of a thermal conductivity (W/m·K), which was performed by using a quick thermal conductivity meter QTM-500, manufactured by Kyoto Electronics Manufacturing Co., Ltd., in accordance with a transient hot-wire method. The results are also shown in Tables 1 to 4.

Electromagnetic Wave Absorbing Property:

By using the silicone compositions that served as sample 1-1 to sample 9-2, mixture compositions that constituted curable greases of sample 1 to sample 9 were each prepared as follows: silicone compositions of samples designated with the suffix "-1" were each used as the agent A, silicone compositions of samples designated with the suffix "-2" were each used as the agent B, and the agent A and the agent B were mixed together and allowed to stand at 25° C. for 24 hours. Each of the mixture compositions was formed into a toroidal shape having an outside diameter of 20 mm, an inside diameter of 5 mm, and a thickness of 8 mm, and thus, a test specimen for measuring a permeability was prepared. The test specimen was subjected to a measurement of a relative permeability μ' at a frequency of 1 MHz to 1 GHz, which was performed by using an impedance/material analyzer E4991A (manufactured by Keysight Technologies) and a magnetic material measuring electrode 16454A (manufactured by Keysight Technologies). Tables 1 to 3 show relative permeabilities at 10 MHz.

By using the silicone compositions that served as sample 10-1 to sample 13-2, mixture compositions that constituted curable greases of sample 10 to sample 13 were each prepared as follows: silicone compositions of samples designated with the suffix "-1" were each used as the agent A, silicone compositions of samples designated with the suffix "-2" were each used as the agent B, and the agent A and the agent B were mixed together and allowed to stand at 25° C. for 24 hours. Each of the mixture compositions was formed into a toroidal shape having an outside diameter of 7 mm, an inside diameter of 3 mm, and a thickness of 1 mm, and thus, a test specimen for measuring a permeability was prepared. The test specimen was subjected to a measurement of a relative permeability μ' at a frequency of 100 MHz to 18 GHz, which was performed by using a vector network analyzer E5071A (manufactured by Keysight Technologies) and a coaxial sample holder CSH2-APC7 (manufactured by Kanto Electronic Application and Development Inc.), which is a magnetic material measuring electrode. Table 4 shows relative permeabilities at 10 GHz.

TABLE 1

| | | Comparative sample 1-1 | Comparative sample 1-2 | Sample 1-1 | Sample 1-2 | Sample 2-1 | Sample 2-2 |
|---|---|---|---|---|---|---|---|
| Formulation (parts by mass) | | | | | | | |
| Liquid silicone 1 | | 100 | — | 100 | — | 100 | — |
| Liquid silicone 2 | | — | 100 | — | 100 | — | 100 |
| Platinum catalyst | | 0.3 | — | 0.3 | — | 0.3 | — |
| Silane coupling agent | | 1 | 1 | 1 | 1 | 1 | 1 |
| High-specific-gravity soft magnetic filler | | 760 | 760 | 760 | 760 | 760 | 760 |
| Intermediate-specific-gravity thermally conductive filler | Spherical alumina 1 | 200 | 200 | 200 | 200 | 200 | 200 |
| | Spherical alumina 2 | 100 | 100 | 100 | 100 | 100 | 100 |
| | α-alumina single crystal particles | 80 | 80 | 80 | 80 | 80 | 80 |
| | Aluminum hydroxide | 40 | 40 | 40 | 40 | 40 | 40 |
| Anti-thickening and anti-settling agent 1 | | — | — | 6 | 6 | 12 | 12 |
| Anti-thickening and anti-settling agent 2 | | — | — | — | — | — | — |
| Anti-thickening and anti-settling agent 3 | | — | — | — | — | — | — |
| Anti-thickening and anti-settling agent 4 | | — | — | — | — | — | — |
| Anti-thickening and anti-settling agent 5 | | — | — | — | — | — | — |
| Anti-thickening and anti-settling agent 6 | | — | — | — | — | — | — |
| Anti-thickening and anti-settling agent 7 | | — | — | — | — | — | — |
| Evaluation | | | | | | | |
| Viscosity (Pa · s) | measured at 5 rpm | 458 | 412 | 308 | 284 | 360 | 294 |
| | measured at 10 rpm | 296 | 265 | 212 | 194 | 241 | 203 |
| Degree of settling | | 2 | 2 | 4 | 4 | 4 | 4 |
| Degree of oil separation (%) | | 1.2 | 1.2 | 0.5 | 0.5 | 0.8 | 0.8 |
| Thermal conductivity (W/m · K) | | 1.8 | | 1.8 | | 1.8 | |
| Relative permeability 10 MHz | | 7.3 | | 7.1 | | 7.2 | |

TABLE 2

| | | Sample 3-1 | Sample 3-2 | Sample 4-1 | Sample 4-2 | Sample 5-1 | Sample 5-2 |
|---|---|---|---|---|---|---|---|
| Formulation (parts by mass) | | | | | | | |
| Liquid silicone 1 | | 100 | — | 100 | — | 100 | — |
| Liquid silicone 2 | | — | 100 | — | 100 | — | 100 |
| Platinum catalyst | | 0.3 | — | 0.3 | — | 0.3 | — |
| Silane coupling agent | | 1 | 1 | 1 | 1 | 1 | 1 |
| High-specific-gravity soft magnetic filler | | 760 | 760 | 760 | 760 | 760 | 760 |
| Intermediate-specific-gravity thermally conductive filler | Spherical alumina 1 | 200 | 200 | 200 | 200 | 200 | 200 |
| | Spherical alumina 2 | 100 | 100 | 100 | 100 | 100 | 100 |
| | α-alumina single crystal particles | 80 | 80 | 80 | 80 | 80 | 80 |
| | Aluminum hydroxide | 40 | 40 | 40 | 40 | 40 | 40 |
| Anti-thickening and anti-settling agent 1 | | — | — | — | — | — | — |
| Anti-thickening and anti-settling agent 2 | | 1.7 | 1.7 | 3.4 | 3.4 | — | — |
| Anti-thickening and anti-settling agent 3 | | — | — | — | — | 1 | 1 |

TABLE 2-continued

|  |  | Sample 3-1 | Sample 3-2 | Sample 4-1 | Sample 4-2 | Sample 5-1 | Sample 5-2 |
|---|---|---|---|---|---|---|---|
| Anti-thickening and anti-settling agent 4 | | — | — | — | — | — | — |
| Anti-thickening and anti-settling agent 5 | | — | — | — | — | — | — |
| Anti-thickening and anti-settling agent 6 | | — | — | — | — | — | — |
| Anti-thickening and anti-settling agent 7 | | — | — | — | — | — | — |
| Evaluation | | | | | | | |
| Viscosity (Pa · s) | measured at 5 rpm | 504 | 364 | unmeasurable | unmeasurable | unmeasurable | unmeasurable |
|  | measured at 10 rpm | 317 | 244 | unmeasurable | unmeasurable | unmeasurable | unmeasurable |
| Degree of settling | | 4 | 4 | 5 | 5 | 5 | 5 |
| Degree of oil separation (%) | | 0.1 | 0.1 | 0.1 | 0.1 | 0.1 | 0.1 |
| Thermal conductivity (W/m · K) | | 1.5 | | 1.5 | | 1.5 | |
| Relative permeability 10 MHz | | 6.7 | | 6 | | 6.1 | |

TABLE 3

|  |  | Sample 6-1 | Sample 6-2 | Sample 7-1 | Sample 7-2 | Sample 8-1 | Sample 8-2 | Sample 9-1 | Sample 9-2 |
|---|---|---|---|---|---|---|---|---|---|
| Formulation (parts by mass) | | | | | | | | | |
| Liquid silicone 1 | | 100 | — | 100 | — | 100 | — | 100 | — |
| Liquid silicone 2 | | — | 100 | — | 100 | — | 100 | — | 100 |
| Platinum catalyst | | 0.3 | — | 0.3 | — | 0.3 | — | 0.3 | — |
| Silane coupling agent | | 1 | 1 | 1 | 1 | 1 | 1 | 1 | 1 |
| High-specific-gravity soft magnetic filler | | 760 | 760 | 760 | 760 | 760 | 760 | 760 | 760 |
| Intermediate-specific-gravity thermally conductive filler | Spherical alumina 1 | 200 | 200 | 200 | 200 | 200 | 200 | 200 | 200 |
|  | Spherical alumina 2 | 100 | 100 | 100 | 100 | 100 | 100 | 100 | 100 |
|  | α-alumina single crystal particles | 80 | 80 | 80 | 80 | 80 | 80 | 80 | 80 |
|  | Aluminum hydroxide | 40 | 40 | 40 | 40 | 40 | 40 | 40 | 40 |
| Anti-thickening and anti-settling agent 1 | | — | — | — | — | — | — | — | — |
| Anti-thickening and anti-settling agent 2 | | — | — | — | — | — | — | — | — |
| Anti-thickening and anti-settling agent 3 | | — | — | — | — | — | — | — | — |
| Anti-thickening and anti-settling agent 4 | | 6 | 6 | — | — | — | — | — | — |
| Anti-thickening and anti-settling agent 5 | | — | — | 6 | 6 | — | — | — | — |
| Anti-thickening and anti-settling agent 6 | | — | — | — | — | 6 | 6 | — | — |
| Anti-thickening and anti-settling agent 7 | | — | — | — | — | — | — | 6 | 6 |
| Evaluation | | | | | | | | | |
| Viscosity (Pa · s) | measured at 5 rpm | | | | | | | | |
|  | measured at 10 rpm | 292 | 275 | 300 | 278 | 270 | 251 | 281 | 249 |
| Degree of settling | | 4 | 4 | 4 | 4 | 4 | 4 | 4 | 4 |
| Degreeof oil separation (%) | | 0.5 | 0.5 | 0.2 | 0.2 | 0.1 | 0.1 | 0.2 | 0.2 |
| Thermal conductivity (W/m · K) | | 1 8 | | 1.8 | | 1.8 | | 1.8 | |
| Relative permeability 10 MHz | | 7.1 | | 7.0 | | 7.2 | | 7.1 | |

TABLE 4

|  |  | Sample 10-1 | Sample 10-2 | Sample 11-1 | Sample 11-2 | Sample 12-1 | Sample 12-2 | Sample 13-1 | Sample 13-2 |
|---|---|---|---|---|---|---|---|---|---|
| Formulation (parts by mass) | | | | | | | | | |
| Liquid silicone 1 | | 100 | | 100 | | 100 | | 100 | |
| Liquid silicone 2 | | | 100 | | 100 | | 100 | | 100 |
| Platinum catalyst | | 0.3 | | 0.3 | | 0.3 | | 0.3 | |
| Silane coupling agent | | 1 | 1 | 1 | 1 | 1 | 1 | 1 | 1 |
| High-specific-gravity soft magnetic filler 1 | | 1400 | 1400 | 1400 | 1400 | | | | |
| High-specific-gravity soft magnetic filler 2 | | | | | | 1020 | 1020 | 1020 | 1020 |
| Intermediate-specific-gravity thermally conductive filler | Spherical alumina 1 | | | | | 200 | 200 | 200 | 200 |
|  | Spherical alumina 2 | | | | | 100 | 100 | 100 | 100 |
|  | Spherical alumina 3 | 200 | 200 | 200 | 200 | | | | |
|  | α-alumina single crystal particles | 80 | 80 | 80 | 80 | 80 | 80 | 80 | 80 |
|  | Aluminum hydroxide | 40 | 40 | 40 | 40 | 40 | 40 | 40 | 40 |

TABLE 4-continued

| | Sample 10-1 | Sample 10-2 | Sample 11-1 | Sample 11-2 | Sample 12-1 | Sample 12-2 | Sample 13-1 | Sample 13-2 |
|---|---|---|---|---|---|---|---|---|
| Anti-thickening and anti-settling agent 1 | — | — | 6 | 6 | — | — | 6 | 6 |
| Viscosity (materials A only) (Pa · s) measured at 10 rpm | 628 | | 623 | | 475 | | 455 | |
| Degree of settling | 3 | 3 | 4 | 4 | 3 | 3 | 4 | 4 |
| Degree of oil separation (%) | 0.28 | 0.28 | 0.23 | 0.23 | 0.62 | 0.62 | 0.17 | 0.17 |
| Thermal conductivity (W/m · K) | 2.8 | | 2.8 | | 2.8 | | 2.8 | |
| Relative permeability 10 GHz | 1.0 | | 1.0 | | 1.3 | | 1.3 | |

<Analysis of Test Results>

The results of samples 3-1 to 4-2 indicate that in instances where a silica powder was used as the non-liquid anti-thickening and anti-settling agent, the viscosity increased, and the viscosity could not be measured when the amount of addition was large. Regarding the viscosity of the silicone compositions immediately after preparation, a viscosity decreasing effect was observed in samples 1-1 to 2-2 and 6-1 to 9-2, compared with comparative samples 1-1 and 1-2. A slight viscosity increasing effect was observed in samples 5-1 and 5-2.

Regarding the settling suppression effect, with the results of the degree of settling of comparative samples 1-1 and 1-2 taken into account, it was found that all of the samples 1-1 to 9-2, to which an anti-thickening and anti-settling agent had been added, had a settling suppression effect.

Regarding the thermal conductivity performance, it was found that the two-component curable greases obtained from the respective mixtures of samples 1-1 to 9-2, to which an anti-thickening and anti-settling agent had been added, exhibited a thermal conductivity substantially comparable to that of the two-component curable grease obtained from the mixture of comparative samples 1-1 and 1-2, to which no anti-thickening and anti-settling agent had been added.

Regarding the electromagnetic wave absorbing performance, it was found that the two-component curable greases obtained from the respective mixtures of samples 1-1 to 3-2 and 6-1 to 9-2, to which an anti-thickening and anti-settling agent had been added, exhibited a relative permeability substantially comparable to that of the two-component curable grease obtained from the mixture of comparative samples 1-1 and 1-2, to which no anti-thickening and anti-settling agent had been added. Furthermore, from a comparison between the two-component curable grease obtained from the mixture of samples 3-1 and 3-2 and the two-component curable grease obtained from the mixture of samples 4-1 and 4-2, it was found that when the amount of addition of a fumed mixed oxide was excessive, the relative permeability decreased. Furthermore, it was found that the two-component curable grease obtained from the mixture of samples 5-1 and 5-2 had a slightly low relative permeability compared with the two-component curable grease obtained from the mixture of comparative samples 1-1 and 1-2, to which no anti-thickening and anti-settling agent had been added.

From the results of samples 10-1 to 13-2, it was found that in instances where martensitic stainless steel that was an Fe—Cr system iron alloy or stainless steel that was an Fe—Si—Cr system iron alloy, each of which has a higher specific gravity than soft magnetic Ni—Zn ferrites, was used as the high-specific-gravity soft magnetic filler, the overall viscosity increased, which made the separation unlikely to occur, and as a result, the degree of oil separation was low, and the settling of the fillers did not noticeably occur. However, it was found that as a result of the addition and use of an anti-thickening and anti-settling agent, the viscosity was somewhat reduced, rather than increased, the degree of oil separation was reduced, which made the separation unlikely to occur, and, regarding the degree of settling, a settling-free composition with no separation was obtained. Accordingly, it was found that even in instances where an iron alloy having a higher specific gravity than soft magnetic Ni—Zn ferrites was used as the high-specific-gravity soft magnetic filler, the addition of an anti-thickening and anti-settling agent suppressed settling, in the silicone composition, of the high-specific-gravity soft magnetic filler and the intermediate-specific-gravity thermally conductive filler, which have a higher specific gravity than the liquid silicone. Regarding the thermal conductivity and the relative permeability, it was found that no significant change was caused by the addition of an anti-thickening and anti-settling agent.

The invention claimed is:

1. A silicone composition comprising:
   liquid silicone;
   a high-specific-gravity soft magnetic filler having a specific gravity of 4.5 or greater;
   an intermediate-specific-gravity thermally conductive filler having a specific gravity of 4.0 or less; and
   a non-liquid anti-thickening and anti-settling agent,
   wherein the anti-thickening and anti-settling agent comprise crystalline cellulose surface-coated with sodium carboxymethyl cellulose,
   a content of the high-specific-gravity soft magnetic filler is within a range of 200 to 1500 parts by mass per 100 parts by mass of the liquid silicone,
   a content of the intermediate-specific-gravity thermally conductive filler is within a range of 200 to 1500 parts by mass per 100 parts by mass of the liquid silicone, and
   a content of the anti-thickening and anti-settling agent is within a range of 1.0 to 50 parts by mass per 100 parts by mass of the liquid silicone.

2. The silicone composition according to claim 1, wherein the anti-thickening and anti-settling agent further comprises at least one selected from polysaccharides having a pyranose ring; and nitrogen-containing polysaccharide polymers.

3. The silicone composition according to claim 1, wherein the anti-thickening and anti-settling agent further comprises at least one selected from crystalline cellulose, cellulose powder, starch, amylose, amylopectin, glycogen, dextrin, chitin, and chitosan.

4. The silicone composition according to claim 1, wherein the anti-thickening and anti-settling agent comprises assemblies of crystalline cellulose particles, and the assemblies have one of a generally spherical shape, a granular shape, a blocky shape, and an aggregate shape.

5. The silicone composition according to claim 1, wherein the anti-thickening and anti-settling agent has an angle of repose of 34° to 57°.

6. The silicone composition according to claim 1, wherein the high-specific-gravity soft magnetic filler is at least one selected from the group consisting of ferrites, iron, and iron-containing alloys.

7. A silicone composition, comprising:
liquid silicone;
a high-specific-gravity soft magnetic filler having a specific gravity of 4.5 or greater;
an intermediate-specific-gravity thermally conductive filler having a specific gravity of 4.0 or less; and
a non-liquid anti-thickening and anti-settling agent
wherein the anti-thickening and anti-settling agent has an average particle diameter of 10 to 500 μm
a content of the high-specific-gravity soft magnetic filler is within a range of 200 to 1500 parts by mass per 100 parts by mass of the liquid silicone,
a content of the intermediate-specific-gravity thermally conductive filler is within a range of 200 to 1500 parts by mass per 100 parts by mass of the liquid silicone, and
a content of the anti-thickening and anti-settling agent is within a range of 1.0 to 50 parts by mass per 100 parts by mass of the liquid silicone.

8. The silicone composition according to claim 7, wherein the anti-thickening and anti-settling agent comprises at least one selected from polysaccharides having a pyranose ring; and nitrogen-containing polysaccharide polymers.

9. The silicone composition according to claim 7, wherein the anti-thickening and anti-settling agent comprises at least one selected from crystalline cellulose, cellulose powder, starch, amylose, amylopectin, glycogen, dextrin, chitin, and chitosan.

10. The silicone composition according to claim 7, wherein the anti-thickening and anti-settling agent comprises assemblies of crystalline cellulose particles, and the assemblies have one of a generally spherical shape, a granular shape, a blocky shape, and an aggregate shape.

11. The silicone composition according to claim 7, wherein the anti-thickening and anti-settling agent has an angle of repose of 34° to 57°.

12. The silicone composition according to claim 7, wherein the high-specific-gravity soft magnetic filler is at least one selected from the group consisting of ferrites, iron, and iron-containing alloys.

13. A curable grease, which is a two-component curable grease comprising a combination of a base compound and a curing agent that are used by being mixed together when used, the curable grease being to be cured by mixing of the base compound with the curing agent,
wherein
the base compound is a first silicone composition which comprises:
first liquid silicone which is an organopolysiloxane having a vinyl group at an end thereof;
a first high-specific-gravity soft magnetic filler having a specific gravity of 4.5 or greater;
a first intermediate-specific-gravity thermally conductive filler having a specific gravity of 4.0 or less; and
a first non-liquid anti-thickening and anti-settling agent, and
wherein
the curing agent is a second silicone composition which comprises:
second liquid silicone which is an organohydrogenpolysiloxane,
a second high-specific-gravity soft magnetic filler having a specific gravity of 4.5 or greater;
a second intermediate-specific-gravity thermally conductive filler having a specific gravity of 4.0 or less; and
a second non-liquid anti-thickening and anti-settling agent.

* * * * *